United States Patent [19]

Crowe

[11] Patent Number: 4,633,949
[45] Date of Patent: Jan. 6, 1987

[54] METHOD OF PREVENTING PRECIPITATION OF FERROUS SULFIDE AND SULFUR DURING ACIDIZING

[75] Inventor: Curtis W. Crowe, Tulsa, Okla.

[73] Assignee: Dowell Schlumberger Incorporated, Tulsa, Okla.

[21] Appl. No.: 700,832

[22] Filed: Feb. 12, 1985

[51] Int. Cl.$^4$ .................. E21B 41/02; E21B 43/27
[52] U.S. Cl. .................... 166/279; 166/307; 166/310; 166/902; 252/8.553; 252/8.555
[58] Field of Search .............. 166/244 C, 259, 271, 166/279, 307, 310, 371; 252/8.55 C, 8.55 E

[56] References Cited

U.S. PATENT DOCUMENTS

| | | | |
|---|---|---|---|
| 2,175,095 | 10/1939 | Stoesser | 166/307 |
| 2,227,860 | 1/1941 | Morgan et al. | 252/8.55 C |
| 2,335,689 | 11/1943 | Morgan et al. | 252/8.55 C |
| 3,142,335 | 7/1964 | Dill et al. | 166/307 X |
| 3,913,678 | 10/1975 | Blount et al. | 166/310 |
| 4,096,914 | 6/1978 | McLaughlin et al. | 166/307 |
| 4,151,098 | 4/1979 | Dill et al. | 252/8.55 C |
| 4,167,214 | 9/1979 | Street, Jr. | 252/8.55 C X |
| 4,317,735 | 3/1982 | Crowe | 166/307 X |
| 4,537,684 | 8/1985 | Gallup et al. | 252/8.55 C X |

*Primary Examiner*—George A. Suchfield
*Attorney, Agent, or Firm*—L. Wayne White

[57] ABSTRACT

An improved method of acidizing sour gas wells involving the injection of an aqueous acidizing solution comprising: water, an acid, an effective amount of an iron complexing agent (e.g., EDTA) capable of stabilizing the ferrous, Fe(II), ion in solution in the presence of H$_2$S and an effective amount of an iron reducing agent (e.g., erythorbic acid, ascorbic acid and mixtures thereof) capable of reducing the ferric, Fe(III), ion in solution to ferrous Fe(II), ion at a pH of about 6.0 or less. Such a process is effective in reducing and inhibiting the precipitation of Fe(OH)$_3$, FeS and S in sour wells.

13 Claims, 3 Drawing Figures

METHOD OF PREVENTING PRECIPITATION OF FERROUS SULFIDE AND SULFUR DURING ACIDIZING

BACKGROUND OF THE INVENTION

1. Field of the Invention:

This invention relates to treating oil and gas wells. More specifically, this invention relates to a method of preventing the precipitation of ferrous sulfide and sulfur during acidizing of sour wells.

2. Description of the Prior Art:

It is generally known and an accepted commercial practice to stimulate oil and gas production by the use of various aqueous mineral acid solutions and the like. Such acidizing treatments are commonplace in the oil and gas industry and are frequently employed in both production and injection wells. As such, various types of acidizing media with or without specific additives intended to alleviate various specific problems have been historically proposed and employed. For example, formation damage from ferric hydroxide precipitation is a potential problem during any acidizing treatment. Acid readily dissolves iron scale in pipe and equipment, and attacks iron containing minerals present in the formation. This dissolved iron remains in solution until the acid spends. As the pH rises above two that portion of the iron present in the ferric, Fe(III), oxidation state precipitates as gelatinous ferric hydroxide. This can cause serious formation damage.

Iron dissolved during an acidizing treatment can exist in either ferric, Fe(III), or ferrous, Fe(II), oxidation state. Upon spending of the acid, the iron present in solution in the Fe(III) form will beging to precipitate at a pH of about 2.2. Upon reaching a pH of 3.2, essentially all of the dissolved fe(III) will have precipitated unless an effective iron stabilizer is used. In contrast, Fe(II) hydroxide will not precipitate below a pH of 7.7. Since spent acid ususally reaches a maximum pH of about 5.3, precipitation of the Fe(II) hydroxide is rarely a problem. Consequently, one needs only to be concerned about the stabilizing of the Fe(III) iron dissolved in the acid.

Previous studies have shown that most iron, dissolved by treating acid, is present in the Fe(II) oxidation state. It has been estimated that, on the average, the Fe(II) to Fe(III) ratio of spent acid is about 5:1. This varies greatly, however, depending upon well conditions and the type of formation being treated.

It is generally known that ferric hydroxide precipitation can be prevented by adding iron stabilizers to the acid. Iron stabilizing agents have been used since the early years of acidizing to prevent precipitation of ferric hydroxide from spent acid solutions. Iron sequestering agents as well as reducing agents have been proposed for control of this problem (see, for example, U.S. Pat. Nos. 2,175,081 and 2,175,095). Sequestering agents most commonly used include citric acid, acetic acid, mixtures of citric and acetic acids and ethylenediaminetetraacetic acid (EDTA). Reducing agents most commonly proposed as iron stabilizers were sulfur compounds, such as sulfurous acid or materials which generate sulfurous acid upon addition to HCl. These agents function by converting any ferric ion present to the non-damaging ferrous state. These materials have found limited applications due to problems associated with their use. For example, sulfurous acid reduces Fe(III) as follows:

$$H_2SO_3 + 2FeCl_3 + H_2O \rightarrow 2HCl + 2FeCl_2 + H_2SO_4 \quad (1)$$

Although Fe(III) is reduced to Fe(II), sulfuric acid is formed in the process resulting in precipitation of $CaSO_4$ upon spending of the acid as follows:

$$H_2SO_4 + CaCO_3 \rightarrow CaSO_4 \downarrow + CO_2 + H_2O \quad (2)$$

In addition, $SO_2$ fumes liberated from the sulfuric acid are very irritating making handling of the overall system rather unpleasant.

In addition to the ferrous hydroxide precipitation problem, the present inventor has discovered that other precipitates can form during the acidizing of a sour gas well (as explained later). It has been discovered that the additional precipitates in the case of sour wells are not adequately accounted for by the prior art sequestering and reducing agents, but rather require a specific combination of an iron complexing agent and an iron reducing agent to alleviate and prevent formation damage.

SUMMARY OF THE INVENTION

In view of the prior art, it has been discovered by the present inventor that when an aqueous acid solution containing dissolved ferric ions, $Fe^{+++}$, is contacted with hydrogen sulfide, $H_2S$, during an acidizing workover or other well treatment, the following reaction potentially takes place:

$$2Fe^{+++} + H_2S \rightarrow S^\circ \downarrow + 2Fe^{++} + 2H^+ \quad (3)$$

In addition, it has been confirmed that upon spending of the acid to a pH of about 2, precipitation of ferrous sulfide, FeS, will occur if excess $H_2S$ is present. Thus, precipitation of ferrous sulfide and sulfur can be a source of formation damage in any treatment where iron contaminated acid is used to acidize $H_2S$ containing formations. It is felt that this problem is a further complication of the potential formation damage problems associated with $Fe(OH)_3$ when encountering sour gas or oil formations and to the best knowledge of the inventor was not known or fully appreciated prior to the present invention.

In view of the above, it has been discovered that in addition to the ferric hydroxide precipitation problem associated with spent iron contaminated acidizing solutions, one must contend with ferrous sulfide and free sulfur precipitation when hydrogen sulfide containing formations are being treated. Thus, the present invention provides a method of treating a subterranean earth formation comprising the steps of:

(a) injecting down the well and into the formation an aqueous acidizing solution comprising:
 (i) water,
 (ii) an acid,
 (iii) an effective amount of an iron complexing agent capable of stabilizing the ferrous, Fe(II), ion in solution in the presence of $H_2S$, thus inhibiting the precipitation of FeS, and
 (iv) an effective amount of an iron reducing agent capable of reducing the ferric, Fe(III), ion in solution to the ferrous, Fe(II), ion at a pH of about 6.0 or less, thus inhibiting the formation of elemental sulfur; and (b) recovering from the formation the spent aqueous acidizing solution substantially free of having induced precipitation of FeS, S and $Fe(OH)_3$ downhole.

In one preferred embodiment of the invention, EDTA (ethylenediaminetetraacetic acid) is employed to chelate the ferrous ion thus inhibiting the precipitation of ferrous sulfide while simultaneously erythorbic acid is employed to reduce the ferric ion to ferrous, thus preventing the formation of elemental sulfur by the above reaction.

It is an object of the present invention to provide a method of treating a sour gas and/or oil well with a novel acidizing media that inhibits and prevents the precipitation of sulfur, ferrous sulfide and ferric hydroxide in the spent acid, thereby eliminating formation damage associated with the presence of undesirable precipitates. It is a further object to provide an economical additive package that accomplishes the above object which can be readily and conveniently added to conventional well acidizing solutions prior to injection into the well. It is a further object that this additive package and resulting acidizing solution be compatible with conventional equipment and well treating methodology without presenting additional significant handling or safety considerations. Fulfillment of these objects and the presence and fulfillment of additional objects will be apparent upon complete reading of the enclosed specification and claims when considered in view of the attached drawing.

DESCRIPTION OF THE PREFERRED EMBODIMENTS

Figure 1:
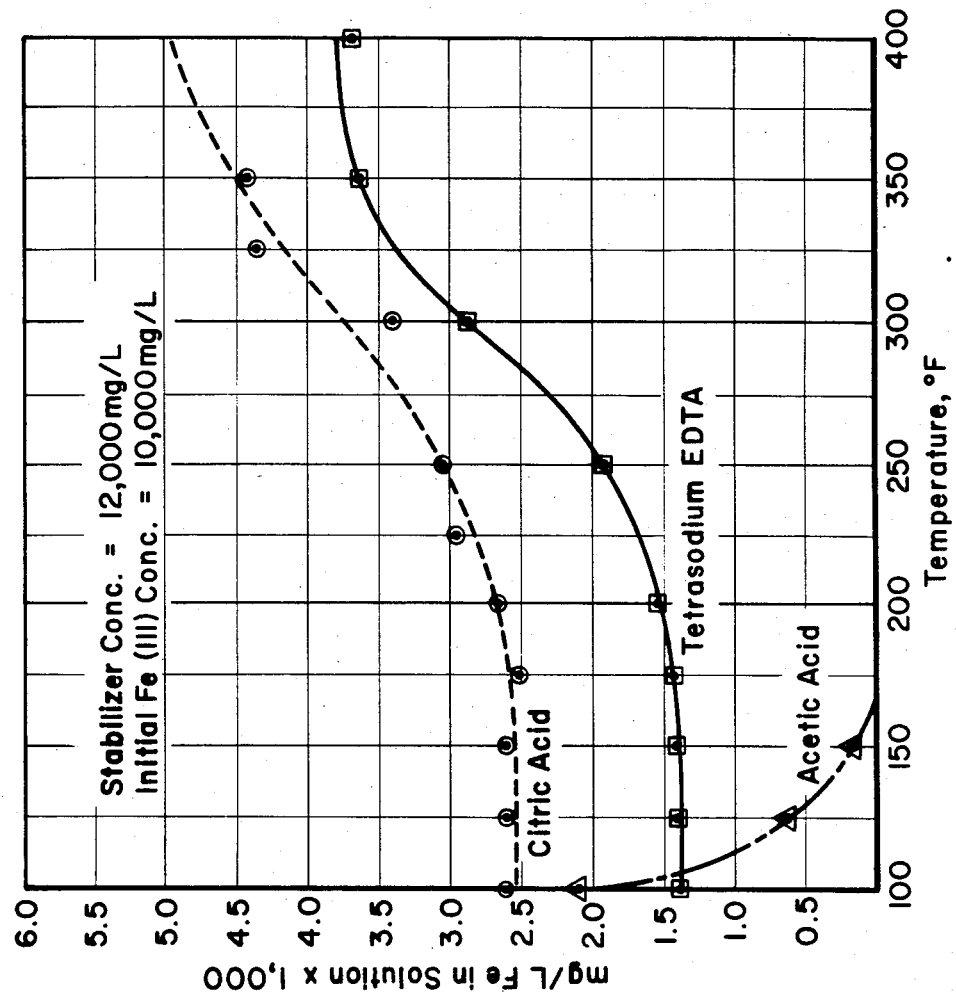
FIG. 1 illustrates a comparative plot of iron, Fe(III), retained (stabilized) in solution as a function of temperature for citric acid, tetrasodium EDTA and acetic acid.

In order to more fully explain and understand the basis for the novel method of preventing the precipitation of ferric hydroxide as well as ferrous sulfide and sulfur according to the present invention, a fundamental understanding of how well conditions effect iron precipitation is necessary. For example, when acidizing sandstones, live acid returns are often observed following the treatment. However, this should not be interpreted to means that no iron stabilizer is needed. While much of the acid in the area around the well bore does remain unspent, a zone of totally spent acid will be formed at the leading edge of the reaction front. Thus, the area around the well bore can be envisioned as involving a series of concentric regions as the acidizing fluid passes outward into the formation. Near the well bore will be unspent acid, further out will be a ring of partially spent acid and furthest away from the well bore will be a region of totally spent acid. In this area, potentially damaging Fe(III) hydroxide precipitation will certainly occur unless an iron stabilizer is used.

In addition, the acid at this leading edge usually contains a greater proportion of dissolved iron since it is the first injected and contains most of the iron resulting from dissolution of scale in the pipe. Because of this high concentration of iron in the spearhead acid, some operators make it a practice to circulate the first one to two tubing volumes of acid from the well to prevent injection of this iron-laden fluid into the formation. In any case, a higher concentration of iron stabilizer should probably be used in the acid initially entering the formation.

Other well conditions can also affect the precipitation of Fe(III) hydroxide by shifting the ratio of Fe(III) to Fe(II) iron. For example, rust or scale formed by oxygen corrosion will be largely of the Fe(III) type and when dissolved by acid will present a potentially more serious precipitation problem. As a result, it is advisable to employ higher concentrations of iron stabilizer when treating through rusty pipe or when treating water injection wells where oxygen corrosion is suspected. Producing wells usually present less of a problem since most iron scales formed in the pipe are of the Fe(II) type.

Another factor tending to minimize ferric hydroxide precipitation is the reduction of Fe(III) by metallic iron. A certain amount of the dissolved Fe(III) is reduced as the acid travels down the pipe as a result of the following reaction:

$$2Fe^{+++} + Fe^0 \rightarrow 3Fe^{++} \qquad (4)$$

Depending upon time in the pipe and well temperature, this reaction can significantly lower the ratio of Fe(III) to Fe(II) iron.

Concern is often expressed about dissolution of iron containing minerals such as siderite and chlorite from the formation and subsequent precipitation of the dissolved iron. Previous studies indicate, however, that most of the iron contained in these minerals occurs in the Fe(II) oxidation state and does not present a precipitation problem. However, numerous exceptions to this rule do exist. Streaks of pure hematite (Fe$_2$O$_3$) are found in some formations while others contain Fe(III) type minerals uniformly distributed within the matrix of the rock. Cores containing Fe(III) iron can often be distinguished by the reddish color which the iron imparts. When this condition is observed or where laboratory tests indicate the presence of a large amount of Fe(III) iron, greater amounts of iron stabilizing agent are needed to control ferric hydroxide precipitation.

Oxygen dissolved in the treating acid can also contribute to ferric hydroxide precipitation by oxidizing Fe(II) iron to the potentially damaging Fe(III) state. The magnitude of this problem is sometimes overestimated, however, since acid exposed to air will contain less than eight milligrams per liter of dissolved oxygen. It can be calculated that oxygen will oxidize about 55 mg/L of Fe(II) iron. Only about 2.4 pounds of EDTA per 1,000 gallons of acid is needed to complex this amount of iron.

A much different situation exists when treating wells in which H$_2$S is present. Hydrogen sulfide is a strong reducing agent which reduces Fe(III) iron to the Fe(II) state and precipitates sulfur by means of the previous reaction (3).

For this reason, it is doubtful if Fe(III) iron can exist in corrosion products or formation minerals in a sour environment. Also, any Fe(III) contained in the treating acid will be quickly reduced to the Fe(II) state thus preventing hydroxide precipitation. This should not, however, be interpreted to mean that iron stabilizers are unnecessary when treating sour wells.

The treatment of sour wells presents an entirely different type of precipitation problem. In addition to sulfur precipitation, by reaction of Fe(III) with H$_2$S, the dissolved Fe(II) will also precipitate as ferrous sulfide upon spending of the acid. This can be demonstrated by calculating the pH at which FeS precipitation occurs in a solution containing 1,000 mg/L Fe(II) and 1,000 mg/L H₂S as follows:

$$K_{SP} FeS = 3.7 \times 10^{-19}$$

$$K_1 \frac{[H^+][HS^-]}{[H_2S]} = 9.1 \times 10^{-8}$$

$$K_2 \frac{[H^+][S^=]}{[HS^-]} = 1.1 \times 10^{-12}$$

$$H_2S = 1,000 \text{ mg/L} = 0.0293M$$
$$Fe^{++} = 1,000 \text{ mg/L} = 0.0179M$$

$$[S^=] = \frac{K_1 K_2 [H_2S]}{[H^+]^2}$$

$$[Fe^{++}] \frac{K_1 K_2 [H_2S]}{[H^+]^2} = 3.7 \times 10^{-19}$$

$$[H^+] = \sqrt{\frac{K_1 K_2 [H_2S][Fe^{++}]}{3.7 \times 10^{-19}}}$$

$$[H^+] = \sqrt{\frac{9.1 \times 10^{-8} \times 1.1 \times 10^{-12} \times 0.0293 \times 0.0179}{3.7 \times 10^{-19}}}$$

$$= 1.191 \times 10^{-2}$$

$$pH = 1.92$$

Thus, the above computation based on the solubility product of FeS and the equilibrium constants (disassociation constants) for H₂S predict that at standard conditions Fe₂S should precipitate at a pH of about two. It is this particular potential problem that the present invention is intended to address and alleviate.

In order to demonstrate this precipitation of FeS from spent acid, a small amount of steel wool was dissolved in 15% HCl to produce an Fe(II) solution. The acid was then spent to a pH of about five using calcium carbonate powder. When H₂S was bubbled through the spent acid, a black precipitate of FeS formed almost instantly.

A similar experiment was next performed except that the Fe(II) was chelated with EDTA. In this test, bubbling H₂S through the spent acid solution failed to produce the previously observed FeS precipitate. Similar results were also obtained using citric acid.

From these tests, it can be concluded that although the type of iron precipitate formed in the presence of H₂S is quite different from that occurring in its absence, conventional iron stabilizers are somewhat effective for controlling both problems. In addition, it was postulated that the use of both a chelating agent, such as EDTA, and an iron reducing agent when treating sour wells may be beneficial. The EDTA would be necessary to prevent FeS precipitation while the reducing agent would serve to reduce any Fe(III) present in the treating acid, thus preventing the previously discussed sulfur precipitation problem. Chelating agents alone are ineffective for controlling the sulfur precipitation problem.

In order to test the above proposed combination of chelating agent and reducing agent as an iron stabilizer system, laboratory evaluation of the iron stabilizers was undertaken.

Data on the performance of most commonly used iron stabilizing agents have previously been published. These data, however, were limited to a maximum temperature of 200° F. In this study, a new series of tests was performed aimed at evaluating performance of iron stabilizers at temperatures up to 400° F. In these tests, 15% hydrochloric acid, containing 12,000 mg/L of iron and 10,000 mg/L Fe(III), added as ferric chloride, was spent under pressure on marble chips. The reaction was performed in glass bottles contained in a high-pressure, stainless steel vessel. Glass containers were used to prevent reduction of Fe(III) by the steel. After 18 hours, samples were removed, filtered and the iron content of the filtrate determined by atomic absorption spectroscopy. Iron content of the filtrate was considered to be the amount stabilized by the additive. Tests were run at 25° F. intervals between 100° and 400° F.

Data comparing the performance of citric acid, acetic acid and Na₄EDTA are shown in FIG. 1. Both citric acid and Na₄EDTA were effective to 400° F. In contrast, acetic acid was ineffective above 150° F. Surpisingly, above 200° F., the efficiency of both citric acid and Na₄EDTA seems to increase. This is apparently due to a change in the mechanism of iron stabilization with both materials being oxidized by the Fe(III) with resulting reduction of Fe(III) to the Fe(II) state. At temperatures above 300° F., most of the dissolved iron in the spent acid is present in the Fe(II) oxidation state.

The ability of chelating agents, such as EDTA and citric acid, to effectively stabilize iron in the presence of the high levels of calcium contained in spent acid has sometimes been questioned. This does not present a problem, however, due to the large differences in the stability constants of Fe(III) vs Ca(II).

Figure 2:
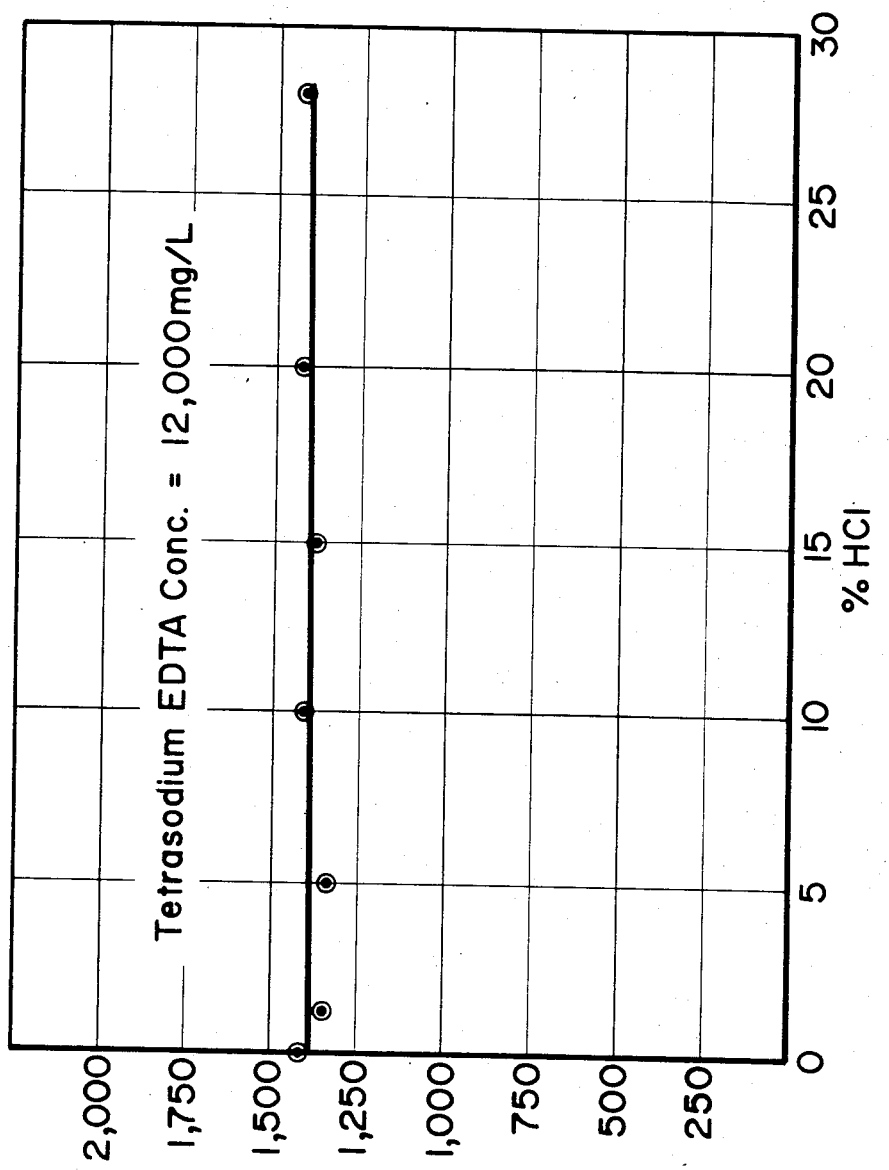
FIG. 2 illustrates a plot of iron retained in a spent hydrochloric acid solution in the presence of tetrasodium EDTA as a function of initial HCl concentration.

Insensitivity of the EDTA-Fe(III) complex to calcium was demonstrated in laboratory tests. In these tests, hydrochloric acid solutions having strengths ranging from 0% to 28% HCl, were prepared and to each was added 10,000 mg/L Fe(III), as FeCl₃, and 12,000 mg/L Na₄EDTA. Solutions were spent to a pH of five using marble chips and then filtered. As is shown in FIG. 2, analysis of these filtrates showed no difference in the amount of iron in solution. It should also be noted that the level of iron present in the spent acid is near the 1,439 mg/L which would be expected based on theoretical calculations.

To further evaluate the proposed combination of chelating agent and reducing agent, laboratory evaluation of erythorbic acid was also undertaken.

Erythorbic acid, a highly efficient iron reducing agent, has recently found application as an iron stabilizer (see co-pending application Ser. No. 397,008). Unlike sulfurous acid, erythorbic acid is nontoxic and presents no handling or environmental problems. Laboratory tests show that one mole of erythorbic acid (surprisingly) is capable of reducing up to eight moles of Fe(III) iron. These properties make erythorbic acid an excellent agent for use in iron stabilization. Erythorbic acid has been used commercially to prevent Fe(III) compatibility problems in gelled acid systems (see U.S. Pat. No. 4,317,735). In this application, it prevents Fe(III) crosslinking of the acid gelling agent in addition to prevent Fe(III) hydroxide precipitation. Recently, it has been introduced as a general purpose iron stabilizer and is finding increased use for this purpose.

Figure 3:
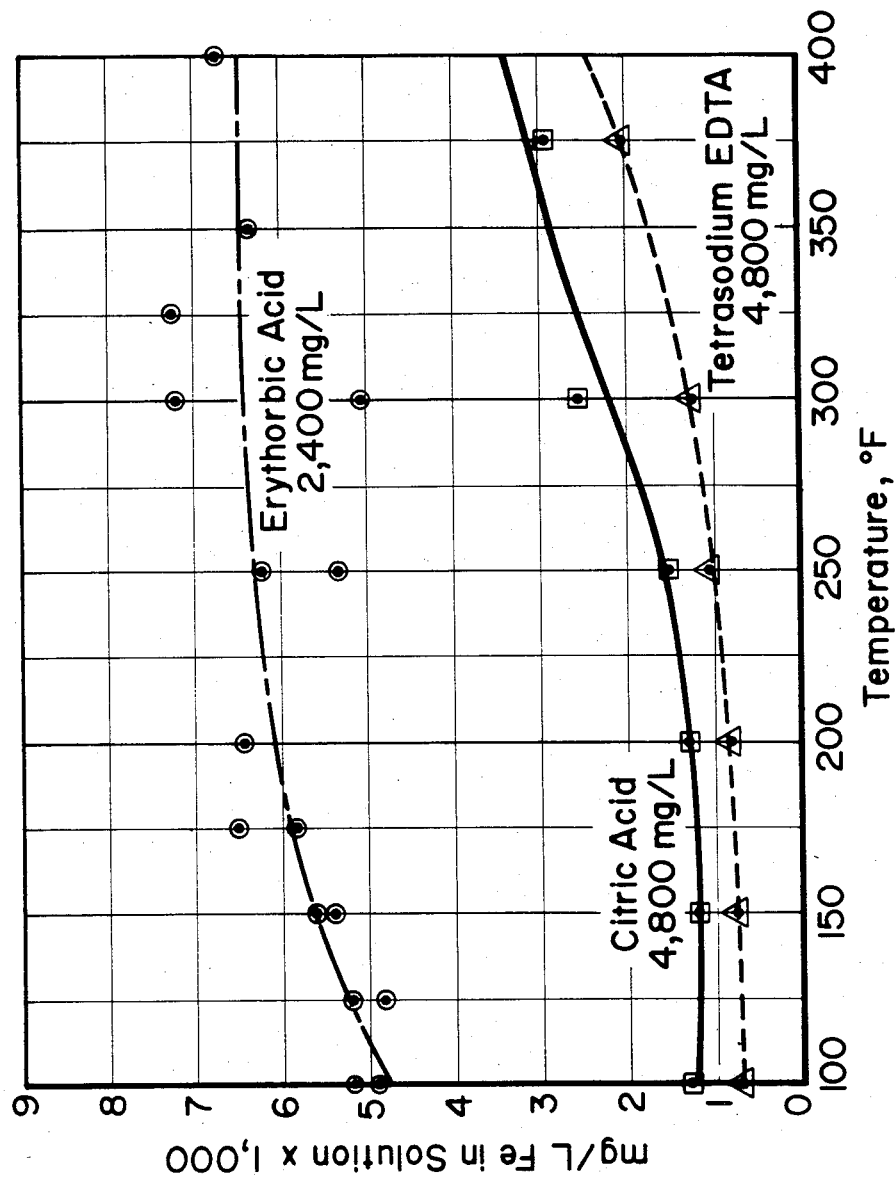
FIG. 3 illustrates a comparative plot of iron, Fe(III), retained in solution as a function of temperature for citric acid, tetrasodium EDTA and erythorbic acid.

In the present study, the performance of erythorbic acid compared to that of citric acid and Na₄EDTA at temperatures up to 400° F. was tested in a manner similar to the data of FIG. 1. The results of this study are presented in FIG. 3. As is seen, at 200° F. the addition of erythorbic acid at a concentration of 2,400 mg/L stabilized approximately 6,000 mg/L iron as compared to only 1,300 mg/L for citric acid at twice the concentration. Thus, erythorbic acid acts as an iron stabilizer in concert with the complexing agent such as citric acid and tetrasodium EDTA. But more importantly, it also has, by virtue of its reducing agent character, the added benefit of preventing the previously discussed precipitation of sulfur resulting from reaction of Fe(III) containing acid with $H_2S$. The use of erythorbic acid presents no treatment problems and makes possible the control of very high levels of Fe(III) with relatively small amounts of agent. Treatments using it have generally resulted in the recovery of increased amounts of dissolved iron in the treating acid.

The iron reducing agent capable of reducing the ferric ion in solution to ferrous ion at a pH of about 6 is preferably an acid compatible reducing agent that does not lead to deleterious precipitation under the conditions characteristic of oil and gas well acidizing. Thus, generally, any reducing acid capable of reducing Fe(III) to Fe(II) in acid medium (pH of about 5 to 6 or stronger acid) is contemplated as being preferred for purposes of this invention. This includes by way of example, but not limited thereto, such acids as erythorbic acid, ascorbic acid and mixtures thereof or the like and reducing acids such as sulfurous acid or compounds which generate sulfurous acid upon addition to an aqueous mineral acid environment. It is further contemplated other reducing agents capable of reducing $Fe^{+++}$ to the $Fe^{++}$ state in strong acid solutions are equivalent for purposes of this invention including suspensions of iron or zinc powder and the like. Preferably, the iron reducing agent that is effective at a pH of about 1.0 is advantageously employed in the present invention. Thus, erythorbic acid, ascorbic acid and mixtures thereof are particularly useful in the present invention. The most preferred iron reducing agent is erythorbic acid.

The iron complexing agent according to the present invention is generally any complexing or chelating agent that associates with the ferrous, Fe(II), ion in acid media and thus inhibits the precipitation of iron sulfide. This includes by way of example, but not limited thereto, EDTA (ethylenediaminetetraacetic acid), NTA (nitrilotriacetic acid) acetic acid, lactic acid, gluconic acid mixtures and salts or partial salts thereof and the like. EDTA is the preferred complexing agent and can be conveniently employed in the form of the tetrasodium salt, Na₄EDTA.

The aqueous acid medium to be employed according to the present invention can be any such mineral or other acid solution or the like as generally known in the art and would include by way of example, but not limited thereto, HCl, HF, acetic, sulfamic, citric, glycolic, $NH_4HF_2$, and mixtures thereof. HCl is the preferred acid medium.

The operative limits for the improved acidizing solutions according to the present invention are considered quite broad and are felt to be governed only by the solubility of the particular additives chosen to be used. Preferably, the concentration limits of the iron reducing agent are from 0.1 pounds to about 50 pounds of reducing agent per 1,0000 gallons of acid solution. The preferred concentration range for the sequestering agent are from about 5 pounds to about 500 pounds of sequestering agent per 1,000 gallons of acid solution. The following table presents what is considered to be a typical concentration, quantity and treatment scheme employing the elements of the present invention as follows:

TABLE (1) Prepare 5,000 gallons of 15% HCl containing a commercially available acid corrosion inhibitor;
(2) To this acid solution add 50 pounds of Na₄EDTA per 1,000 gallons of solution and 10 pounds of erythorbic acid per 1,000 gallons of acid solution; and
(3) Inject the acid solution into the oil or gas producing formation containing enough acid reactive material to spend the acid.

The actual method of injecting and circulating the improved acidizing media according to the present invention can be by essentially any such technique as generally known in the art. As such, the process is contemplated as being compatible with both production and injection wells and can be employed as a preflush, postflush or in combination with another preflush or postflush technique. It is further contemplated that the acidizing media according to the present invention can be advantageously employed with contemporary acid flooding and the like including $CO_2$ flooding.

The benefits and advantages of employing the process according to the present invention are felt to be numerous and commercially significant. First and foremost, the efficacy of the instant process with respect to preventing the precipitation of ferric hydroxide from spent treating acid has been demonstrated from about 100° to 400° F. Furthermore, the improved acidizing media of the present invention has been shown to be an effective iron stabilizer at temperatures up to at least 400° F. In some cases, efficiencies actually increase with elevated temperatures. When compared on a weight basis, erythorbic acid stabilized nine times as much iron as citric acid. Unlike the iron stabilizers which function by complexation, erythorbic acid prevent ferric hydroxide precipitation primarily by reducing ferric, Fe(III), iron to ferrous, (Fe)II), form. The reducing characteristics of erythorbic acid in combination with the complexing and chelating characteristics of the EDTA result in an improved aqueous acidizing media capable of simultaneously suppressing the precipitation of Fe(OH)₃, FeS and S in sour wells even at temperatures well in excess of 200° F. Furthermore, the use of erythorbic acid is nontoxic and present no handling or environmental problems.

Having thus described the invention with a certain degree of particularity, it is manifest that many changes can be made in the details of the invention without departing from the spirit and scope of the invention. Therefore, it is to be understood that the invention is not limited to the embodiments set forth herein for purposes of exemplification, but is to be limited only by the scope of the attached claims, including a full range of equivalents to which each element thereof is entitled.

I claim:

1. A method of treating a subterranean earth formation penetrated by a wellbore comprising the steps of:
   (a) injecting down the wellbore and into contact with the formation an aqueous acidizing solution comprising:

(i) water,
(ii) an acid,
(iii) an effective amount of an organic carboxylic acid iron complexing agent capable of stabilizing the ferrous, Fe(II), ion in solution in the presence of $H_2S$, thus inhibiting the precipitation of FeS, and
(iv) an effective amount of an iron reducing agent capable of reducing the ferric, Fe(III), ion at a pH of about 0.6 or less, thus inhibiting the formation of elemental sulfur; and
(b) recovering from the formation the spent aqueous acidizing solution substantially free of having induced precipitation of FeS, S and $Fe(OH)_3$.

2. A method of claim 1 wherein the iron complexing agent is EDTA.

3. A method of claim 1 wherein the iron reducing agent is selected from the group consisting of erythorbic acid and ascorbic acid.

4. A method of claim 1 wherein the iron complexing agent is EDTA and the iron reducing agent is erythorbic acid.

5. A method of claim 1 wherein the iron complexing agent is nitrilotriacetic acid.

6. A method of claim 1 wherein the iron complexing agent is acetic acid.

7. A method of claim 1 wherein the iron complexing agent is citric acid.

8. A method of claim 1 wherein the iron complexing agent is lactic acid.

9. A method of claim 1 wherein the iron complexing agent is gluconic acid.

10. A method of claim 1 wherein the iron complexing agent is at least one of the acids selected from the group consisting of EDTA, nitrilotriacetic acid, acetic acid, citric acid, lactic acid, gluconic acid and salts or partial salts thereof.

11. A method of claim 10 wherein the iron reducing agent is selected from the group consisting of erythorbic acid and ascorbic acid.

12. A method of claim 11 wherein the iron reducing agent is erythorbic acid.

13. A method of treating a subterranean earth formation penetrated by a wellbore comprising the steps of:
(a) injecting down the wellbore and into contact with the formation an aqueous acidizing solution comprising:
(i) water,
(ii) an acid,
(iii) an effective amount of an organic carboxylic acid iron complexing agent capable of stabilizing the ferrous, Fe(II), ion in solution in the presence of $H_2S$, thus inhibiting the precipitation of FeS, and
(iv) an effective amount of an iron reducing agent capable of reducing the ferric, Fe(III), ion at a pH of about 0.6 or less, thus inhibiting the formation of elemental sulfur; and
(b) shutting in the wellbore.

* * * * *